United States Patent
Ogusu et al.

(10) Patent No.: US 10,698,612 B2
(45) Date of Patent: Jun. 30, 2020

(54) STORAGE APPARATUS AND CONTROL METHOD THEREOF

(71) Applicant: Hitachi, Ltd., Tokyo (JP)

(72) Inventors: Takuya Ogusu, Tokyo (JP); Kouji Iwamitsu, Tokyo (JP); Shinri Inoue, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/354,365

(22) Filed: Mar. 15, 2019

(65) Prior Publication Data
US 2020/0042175 A1 Feb. 6, 2020

(30) Foreign Application Priority Data
Jul. 31, 2018 (JP) ................................ 2018-144147

(51) Int. Cl.
G06F 3/06 (2006.01)
(52) U.S. Cl.
CPC ............ G06F 3/061 (2013.01); G06F 3/0655 (2013.01); G06F 3/0673 (2013.01)
(58) Field of Classification Search
None
See application file for complete search history.

(56) References Cited

U.S. PATENT DOCUMENTS

| | | | | |
|---|---|---|---|---|
| 8,700,948 | B2 * | 4/2014 | Masaki | G06F 11/1092 711/114 |
| 8,959,389 | B2 * | 2/2015 | Kulkarni | G06F 11/2094 714/6.22 |
| 10,073,705 | B1 * | 9/2018 | Raizen | G06F 3/0605 |
| 2006/0143332 | A1 * | 6/2006 | Yagi | G06F 3/0614 710/38 |
| 2008/0034196 | A1 * | 2/2008 | Tanaka | G06F 3/0605 713/1 |
| 2017/0017433 | A1 * | 1/2017 | Ishikawa | G06F 3/0619 |

FOREIGN PATENT DOCUMENTS

JP 2008-040842 A 2/2008

\* cited by examiner

*Primary Examiner* — Tracy C. Chan
(74) *Attorney, Agent, or Firm* — Mattingly & Malur, PC

(57) ABSTRACT

A storage control unit which processes an I/O request from a host apparatus is provided in the storage apparatus and the storage control unit creates a host group by mapping same to each supported OS type and configures a function according to the corresponding OS type for each of the host groups, creates a first volume on the storage apparatus and creates a second volume to which a physical storage area is dynamically allocated from a storage device, according to a volume creation instruction, and the storage control unit creates, according to an instruction to create a volume path from the first volume to the second volume, a volume path which passes through a third volume which is interposed between the first volume and second volume and has been allocated to the host group according to the OS type of the host apparatus provided by the first volume.

4 Claims, 20 Drawing Sheets

FIG.5

DB-SIDE COMPUTE NODE MANAGEMENT TABLE 30

| COMPUTE NODE NAME | OS TYPE | VOL PATH MANAGEMENT TABLE NUMBER |
|---|---|---|
| Compute01 | A | #1 |
| Compute02 | I | #2 |
| Compute03 | H | #3 |
| Compute04 | E | #4 |
| ... | ... | ... |

DB-SIDE VOLUME PATH MANAGEMENT TABLE 31

| GVOL | HVOL | STORAGE CONTROL UNIT | VVOL | IVOL |
|---|---|---|---|---|
| 1 | 1 | 1 | 1 | 1 |
| 2 | 2 | 1 | 2 | 2 |
| 3 | 3 | 3 | 1 | 1 |

MODE PARAMETER TABLE 28

| MODE PARAMETER | FUNCTION |
|---|---|
| 1 | FUNCTION A |
| 2 | FUNCTION B |
| 3 | FUNCTION C |
| 4 | FUNCTION D |
| 5 | FUNCTION E |
| 6 | FUNCTION F |
| 7 | FUNCTION G |
| 8 | FUNCTION H |
| ... | ... |

OS TYPE TABLE 25

| OS TYPE | HG NUMBER | MODE PARAMETER |
|---|---|---|
| A | 0 | 1,2,3 |
| B | 1 | 1,2,4 |
| C | 2 | 1,5 |
| D | 3 | 1,6 |
| E | 4 | 1,2,7 |
| F | 5 | 1,8 |
| G | 6 | 1,9,10 |
| H | 7 | 1,2 |
| ... | ... | ... |

COMPUTE NODE MANAGEMENT TABLE 26

| COMPUTE NODE NAME | HG NUMBER |
|---|---|
| Compute01 | 0 |
| Compute02 | 8 |
| ... | ... |

VOLUME PATH MANAGEMENT TABLE 27

| COMPUTE NODE NAME | HVOL | IVOL |
|---|---|---|
| Compute01 | 1 | 1 |
| Compute01 | 2 | 2 |
| Compute02 | 1 | 3 |
| Compute02 | 3 | 4 |
| ... | ... | ... |

HG-IVOL MANAGEMENT TABLE 29

| IVOL | HG NUMBER |
|---|---|
| 1 | 0 |
| 2 | 0 |
| 3 | 8 |
| 4 | 8 |
| ... | ... |

29A    29B

STORAGE APPARATUS AND CONTROL METHOD THEREOF

CROSS-REFERENCE TO RELATED APPLICATION

The present application claims priority from Japanese application JP 2018-144147, filed on Jul. 31, 2018, the contents of which is hereby incorporated by reference into this application.

TECHNICAL FIELD

The present invention relates to a storage apparatus and control method thereof and is suitably applied to a storage apparatus which is used in an environment where host apparatuses of a plurality of OS (Operating System) types coexist, for example.

BACKGROUND ART

In recent years, a method in which a cluster is configured from a plurality of storage nodes (storage apparatuses) and the whole cluster is provided to a host apparatus as a single storage apparatus by virtualizing these storage nodes by means of SDS (Software Defined Storage) technology has been proposed. Here, SDS denotes a virtual storage apparatus which is constructed by installing software, which functions as a controller in a storage apparatus, on a general-purpose server apparatus.

When a storage system with such a cluster configuration is operated in an environment where host nodes of a plurality of OS types such as Linux (registered trademark), VMware (registered trademark) and Windows (registered trademark) coexist, in order for each storage node to be able to execute a request operation from each host apparatus normally, the internal operation of the storage node must be switched according to the type of OS installed on the host apparatus (hereinafter called the host apparatus OS type).

Note that, in relation to this kind of technology, PTL 1 below discloses a method of determining the OS type of data which is written to a logical volume that has been allocated to the host apparatus.

CITATION LIST

Patent Literature

[PTL 1] Japanese Patent Application Laid-Open Publication No. 2008/40842

SUMMARY OF THE INVENTION

Problems to be Solved by the Invention

As a technique for switching the internal operation of the storage system for each host apparatus OS type, there exists a method in which the host apparatuses are grouped by OS type and different volumes are allocated to these groups (hereinafter called host groups) respectively, and the required function is configured so that an operation according to the corresponding OS type is performed for each volume.

In the foregoing case, when the method described above is applied to a generic SDS product, it is necessary to configure configuration information for the creation of a host group for each OS type, the linking of volumes to each host group, and the linking of each host apparatus (or initiator) to the host groups, but such configuration of configuration information has conventionally been performed by means of manual work by the system administrator.

For this reason, the larger the scale of the storage system, the more troublesome this configuration work becomes and there has been a problem in that, with SDS products, the number of storage nodes forming the storage system and the number of host apparatuses are often increased dynamically (scale-out) and the work to configure the configuration increases.

The present invention was devised in view of the foregoing points and an object thereof is to propose a storage apparatus and control method thereof which are capable of facilitating configuration work and improving user-friendliness by reducing the burden regarding the configuration work.

Means to Solve the Problems

In order to solve this problem, the present invention is a storage apparatus which is used in an environment where host apparatuses of a plurality of OS types coexist, comprising a storage control unit which processes an I/O request from the host apparatuses; and a storage device which provides a physical storage area for reading/writing data from the host apparatuses, wherein the storage control unit creates a host group by mapping same to each of the supported OS types and configures a function which is required when processing the I/O request from the host apparatus of the corresponding OS type for each of the host groups, wherein the storage control unit creates a first volume on the storage apparatus and creates a second volume to which the physical storage area is dynamically allocated from the storage device, according to a volume creation instruction, wherein the storage control unit creates, according to an instruction to create a volume path from the first volume to the second volume, a volume path which passes through a third volume which is interposed between the first volume and second volume and has been allocated to the host group according to the OS type of the host apparatus provided by the first volume, and wherein, as a result of the storage apparatus providing the third volume to the host apparatus, when the I/O request has been supplied, the storage control unit executes I/O processing with respect to the second volume and first volume via the third volume in the volume path while using the function that has been configured for the host group to which the third volume was allocated.

Furthermore, the present invention is a control method of a storage apparatus which is used in an environment where host apparatuses of a plurality of OS types coexist, the storage apparatus having a storage control unit which processes an I/O request from the host apparatus, and a storage device which provides a physical storage area for reading/writing data from the host apparatuses, the control method comprising a first step in which the storage control unit creates a host group by mapping same to each of the supported OS types and configures a function which is required when processing the I/O request from the host apparatus of the corresponding OS type for each of the host groups; a second step in which the storage control unit creates a second volume to which the physical storage area is dynamically allocated from the storage device, according to a volume creation instruction; a third step in which the storage control unit creates, according to an instruction to create a volume path from the first volume to the second volume, a volume path which passes through a third volume which is interposed between the first volume and second volume and has been allocated to the host group according to the OS type of the host apparatus provided by the first volume; and a fourth step in which, when the I/O request targeting the corresponding third volume has been supplied form the host apparatus, the storage control unit executes I/O processing with respect to the second volume and first volume which are coupled via the volume path to the third volume while using the function that has been configured for the host group to which the third volume was allocated.

According to the storage apparatus and control method thereof of the present invention, when a host apparatus is registered in the storage apparatus, it is possible to configure only the volume mapped to the host apparatus and the OS type of the host apparatus, and the work to configure configuration information that has conventionally been required, such as the creation of a host group for each OS type, the linking of volumes to each host group, and the linking of host apparatuses to the host groups, can be omitted.

Advantageous Effects of the Invention

According to the present invention, it is possible to realize a storage apparatus and control method thereof which are capable of facilitating configuration work when a new storage apparatus or host apparatus or the like is introduced and of improving user-friendliness by reducing the burden on the system administrator regarding this configuration work.

BRIEF DESCRIPTION OF DRAWINGS

FIG. 5 is a diagram showing a configuration example of a DB-side compute node management table.

FIG. 6 is a table showing a configuration example of a DB-side volume path management table.

FIG. 7 is a table showing a configuration example of a mode parameter table.

FIG. 8 is a table showing a configuration example of an OS type table.

FIG. 9 is a table showing a configuration example of a compute node management table.

FIG. 10 is a table showing a configuration example of a volume path management table.

FIG. 11 is a table showing a configuration example of an HG-IVOL management table.

DESCRIPTION OF EMBODIMENTS

An embodiment of the present invention will now be explained in detail with reference to the appended drawings.

(1) Configuration of Information Processing System According to this Embodiment

Figure 1:
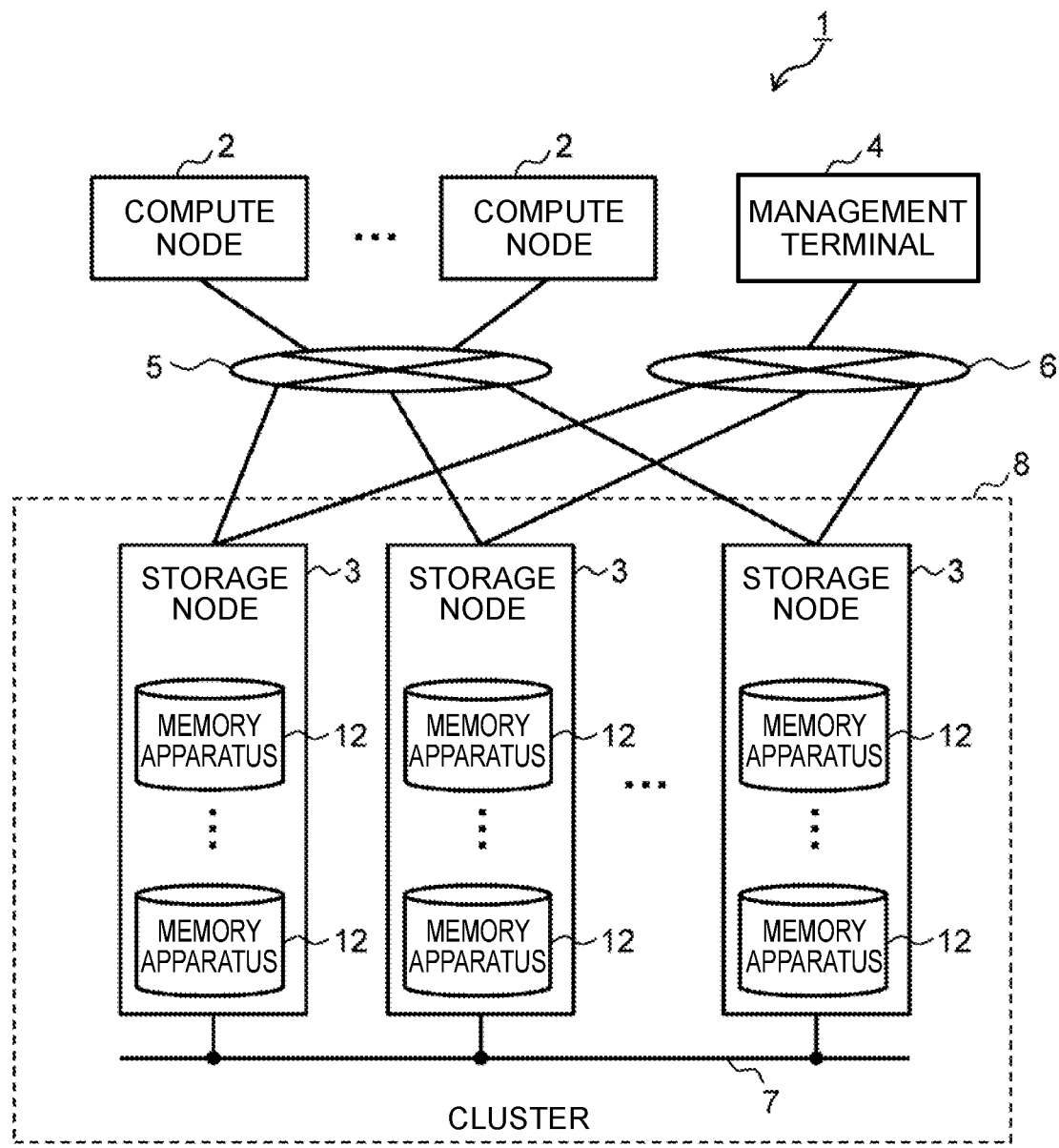
FIG. 1 is a block diagram showing an overall configuration of an information processing system according to the embodiment.

In FIG. 1, 1 denotes the overall information processing system according to the embodiment. The information processing system 1 is configured by comprising a plurality of compute nodes 2, a plurality of storage nodes 3, and a management terminal 4.

The compute nodes 2 and storage nodes 3 are coupled to one another via a storage service network 5 which is configured from a Fibre Channel (FC), Ethernet (registered trademark), InfiniBand or wireless LAN (Local Area Network) or the like, for example, and the management terminal 4 and each of the storage nodes 3 are coupled to one another via a management network 6 which is configured from a LAN or wireless LAN or the like, for example. Furthermore, the storage nodes 3 are coupled to one another via a back-end network 7 which is configured from an Ethernet (registered trademark), InfiniBand or wireless LAN or the like. However, two or more of the storage service network 5, management network 6 and back-end network 7 could also be configured from the same network.

The compute node 2 is a general-purpose computer apparatus which functions as a host apparatus (high order apparatus) for the storage node 3. The compute node 2 is a virtual computer apparatus like a virtual machine. The compute node 2 sends a read request or write request (hereinafter suitably referred to collectively as an I/O (Input/Output) request) to the storage nodes 3 via the storage service network 5 according to a user operation or a request from an installed application program.

Figure 2:
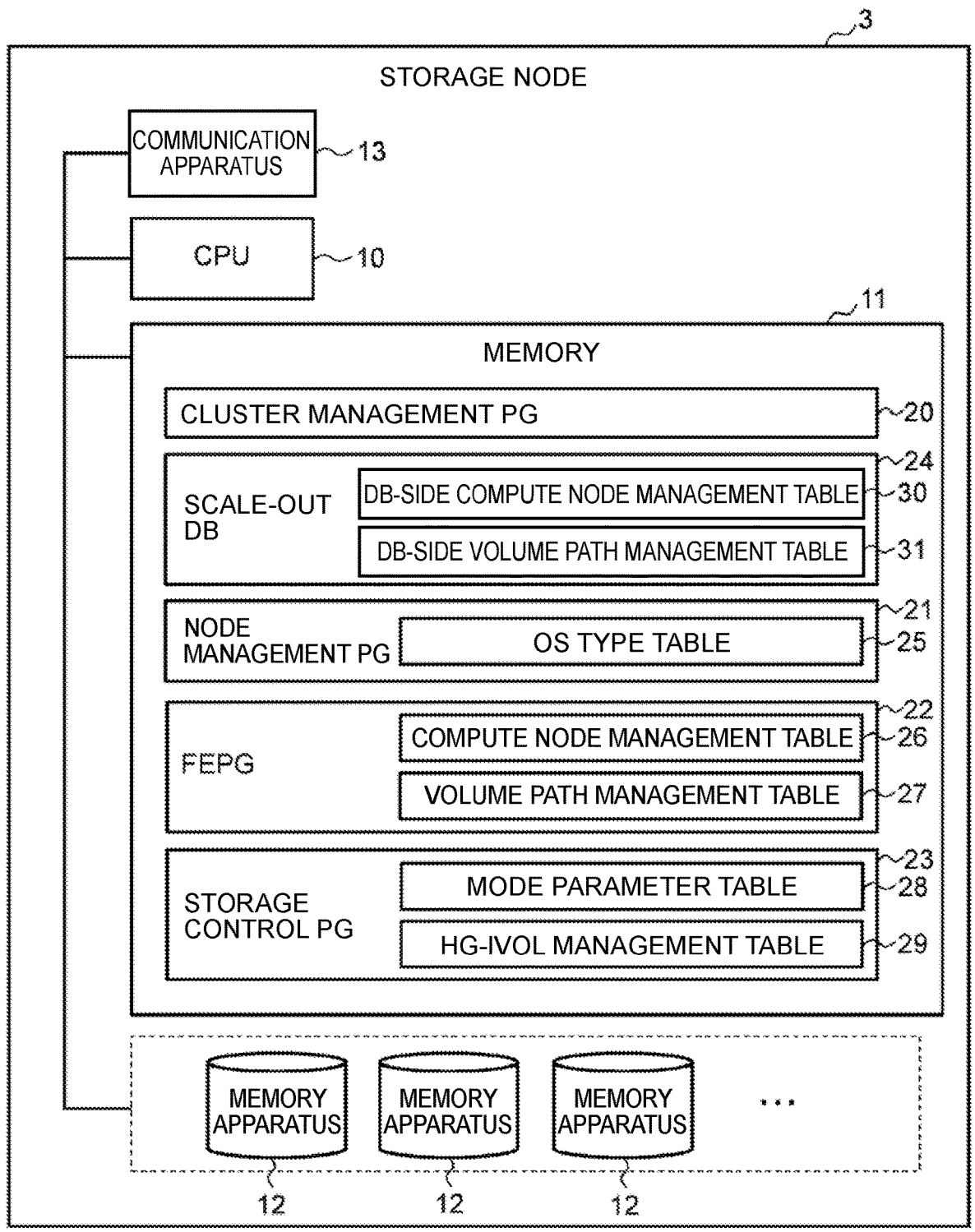
FIG. 2 is a block diagram showing a hardware configuration of a storage node.

The storage nodes 3 are general-purpose physical server apparatuses which provide a storage area for reading/writing data to the compute nodes 2. As shown in FIG. 2, the storage node 3 is configured by comprising one or more of a CPU (Central Processing Unit) 10, a memory 11, a storage device 12, and a communication apparatus 13 respectively.

The CPU 10 is a processor which is tasked with controlling the overall operation of the storage node 3. Furthermore, the memory 11 is configured from a volatile semiconductor memory such as an SRAM (Static RAM (Random-access memory)) or a DRAM (Dynamic RAM), and is used, as a working memory of the CPU 10, to temporarily hold various programs and required data and the like. Various processing of the whole storage node 3, as described subsequently, is executed as a result of the CPU 10 executing various programs which are stored in the memory 11.

A cluster management program 20, node management program 21, front-end program 22, storage control program 23 and scale-out database 24, as well as an OS type table 25 which is managed by the node management program 21, a compute node management table 26 and volume path management table 27 which are managed by the front-end program 22, a mode parameter table 28 and an HG-IVOL management table 29 which are managed by the storage control program 23, and a DB-side compute node management table 30 and a DB-side volume path management table 31 which form part of the scale-out database 24, which will be described subsequently, are also stored and managed in the memory 11.

The storage device 12 is configured from a high-capacity, nonvolatile storage device such as an NVMe (Non-Volatile Memory) drive, a SAS (Serial Attached SCSI (Small Computer System Interface)) drive, a SATA (Serial ATA (Advanced Technology Attachment)) drive, an SSD (Solid State Drive) or an SCM (Storage Class Memory) and provides a physical storage area for reading/writing data to the compute nodes 2.

The communication apparatus 13 is an interface with which the storage nodes 3 perform communications with the compute nodes 2 via the storage service network 5 and perform communications with the management terminal 4 via the management network 6, and with which the storage nodes 3 perform communications with the other storage nodes 3 via the back-end network 7, and is configured from an NIC (Network Interface Card) such as an FC card, LAN card or wireless LAN card, or the like, for example. The communication apparatus 13 performs protocol control during communication with the compute nodes 2, management terminal 4, and other storage nodes 3.

Note that in the case of this embodiment, each of the storage nodes 3 are, as shown in FIG. 1, organized in groups called clusters together with one or a plurality of other storage nodes 3, and managed in cluster units. Although FIG. 1 illustrates a case where only one cluster 8 has been configured in the information processing system 1, a plurality of the clusters 8 could also be configured in the information processing system 1.

The management terminal 4 is a computer apparatus which an administrator of the information processing system 1 (hereinafter called the system administrator) uses to perform configuration management and varied configuration of the information processing system 1. The management terminal 4 sends required instructions to the compute nodes 2 and storage nodes 3 and so forth according to operations by the system administrator.

Figure 3:
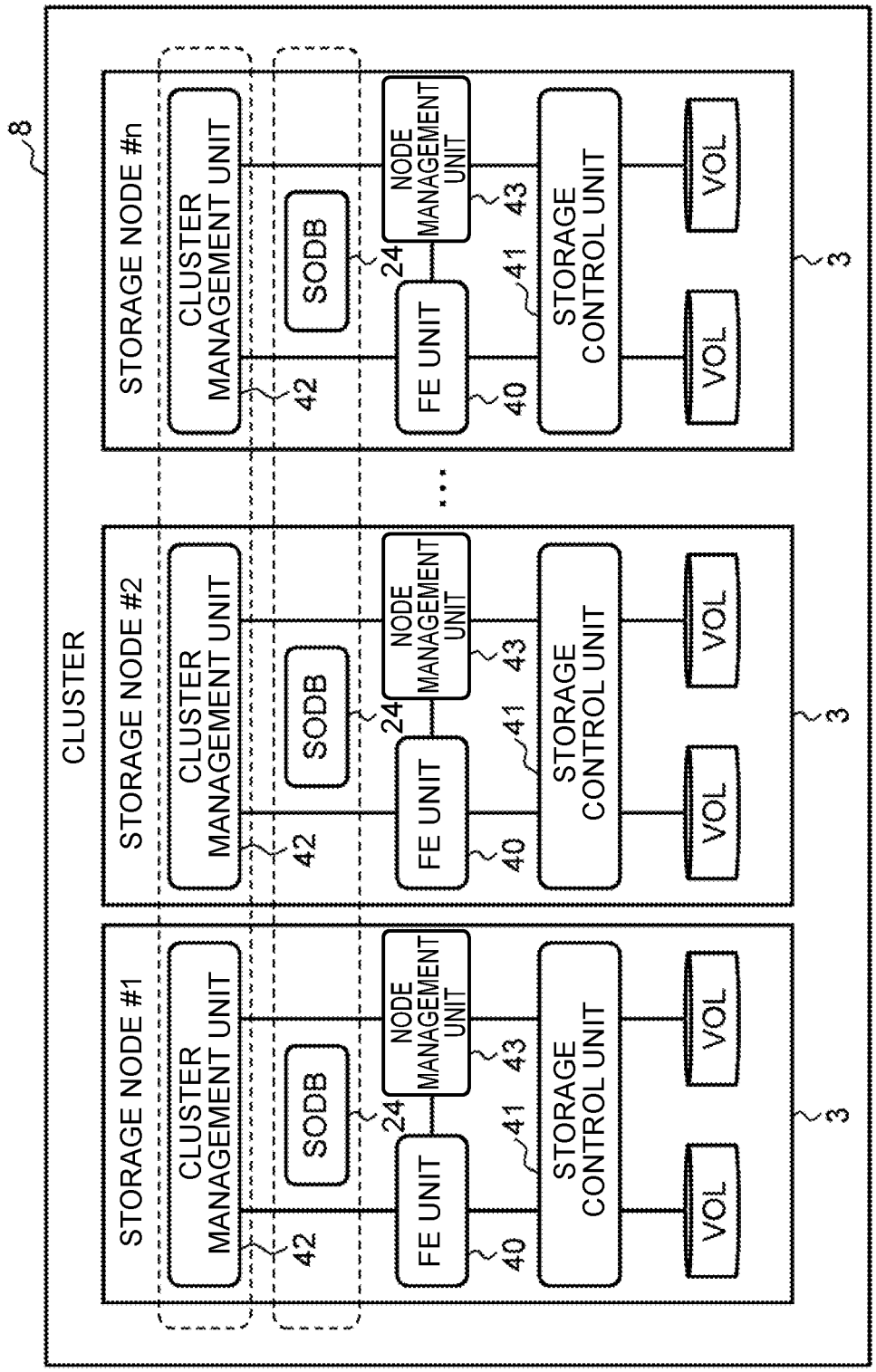
FIG. 3 is a block diagram showing a logical configuration of storage nodes.

FIG. 3 shows a logical configuration of the storage nodes 3 according to the embodiment. As shown in FIG. 3, the storage nodes 3 are each configured by comprising a front-end unit 40, one or a plurality of storage control units 41, a cluster management unit 42, a node management unit 43, and a scale-out database 24.

The front-end unit 40 is a function unit which is embodied as a result of the CPU 10 (FIG. 2) executing the front-end program 22 (FIG. 2) stored in the memory 11 (FIG. 2) and functions as a front end for I/O processing in the storage nodes 3. For example, when an I/O request has been supplied from the compute node 2, the front-end unit 40 receives the I/O request and transfers the received I/O request to the storage control unit 41 in its own node which is to execute the I/O request and to the other storage nodes 3 where the storage control unit 41 which is to execute the I/O request is disposed.

The storage control unit 41 is a function unit which is embodied as a result of the CPU 10 executing the storage control program 23 (FIG. 2) stored in the memory 11 and functions as an SDS controller. The storage control unit 41 executes the I/O request from the compute node 2 which has been supplied by the front-end unit 40.

The cluster management unit 42 is a function unit which is embodied as a result of the CPU 10 executing the cluster management program 20 (FIG. 2) stored in the memory 11 and has functions for executing control processing relating to the whole cluster 8 and control processing relating to scale-out of the cluster 8. In the information processing system 1 according to the embodiment, one cluster management unit 42 among the cluster management units 42 which are mounted in each of the storage nodes 3 in the cluster 8 is configured as the 'master,' and the cluster management unit (hereinafter called the master cluster management unit) 42 which has been configured as the 'master' executes various control processing relating to the whole cluster 8 according to an instruction from the management terminal 4 (FIG. 1) while maintaining the consistency of the whole cluster 8.

The node management unit 43 is a function unit which is embodied as a result of the CPU 10 executing the node management program 21 (FIG. 2) stored in the memory 11 and which has a function for executing various control processing which is concluded within its own node according to a request from the master cluster management unit 42. In reality, the master cluster management unit 42 issues a request to the node management unit 43 of each storage node 3 to execute processing which is concluded within each storage node 3 to avoid a load concentration on itself. Furthermore, when this request is supplied, the node management unit 43 executes control processing on the front-end unit 40 and storage control unit 41 within its own node according to this request.

The scale-out database 24 is a database which stores configuration information of each registered compute node 2 (including information on the OS type of the installed OS), and configuration information of the cluster 8 (the location and capacity of the volumes VOL and the mapping relationships between the compute nodes 2 and volume VOL, and so forth). In the case of the information processing system 1, the scale-out database 24 has a built-in function which enables mutual communication to be performed with the scale-out database 24 of other storage nodes 3 via the back-end network 7.

Furthermore, in the information processing system 1, when the scale-out database 24 of one storage node 3 has been updated, the scale-out database 24 transfers pre- and post-update differential data to the other storage nodes 3 which form the same cluster 8. Furthermore, the scale-out databases 24 of the other storage nodes 3 which have received this differential data update the data same are holding based on the differential data. Thus, in the information processing system 1, when the scale-out database 24 of one storage node 3 has been updated, the scale-out databases 24 of the other storage nodes 3 are likewise also updated synchronously.

(2) Configuration of Volume Paths in Storage Node

Figure 4:
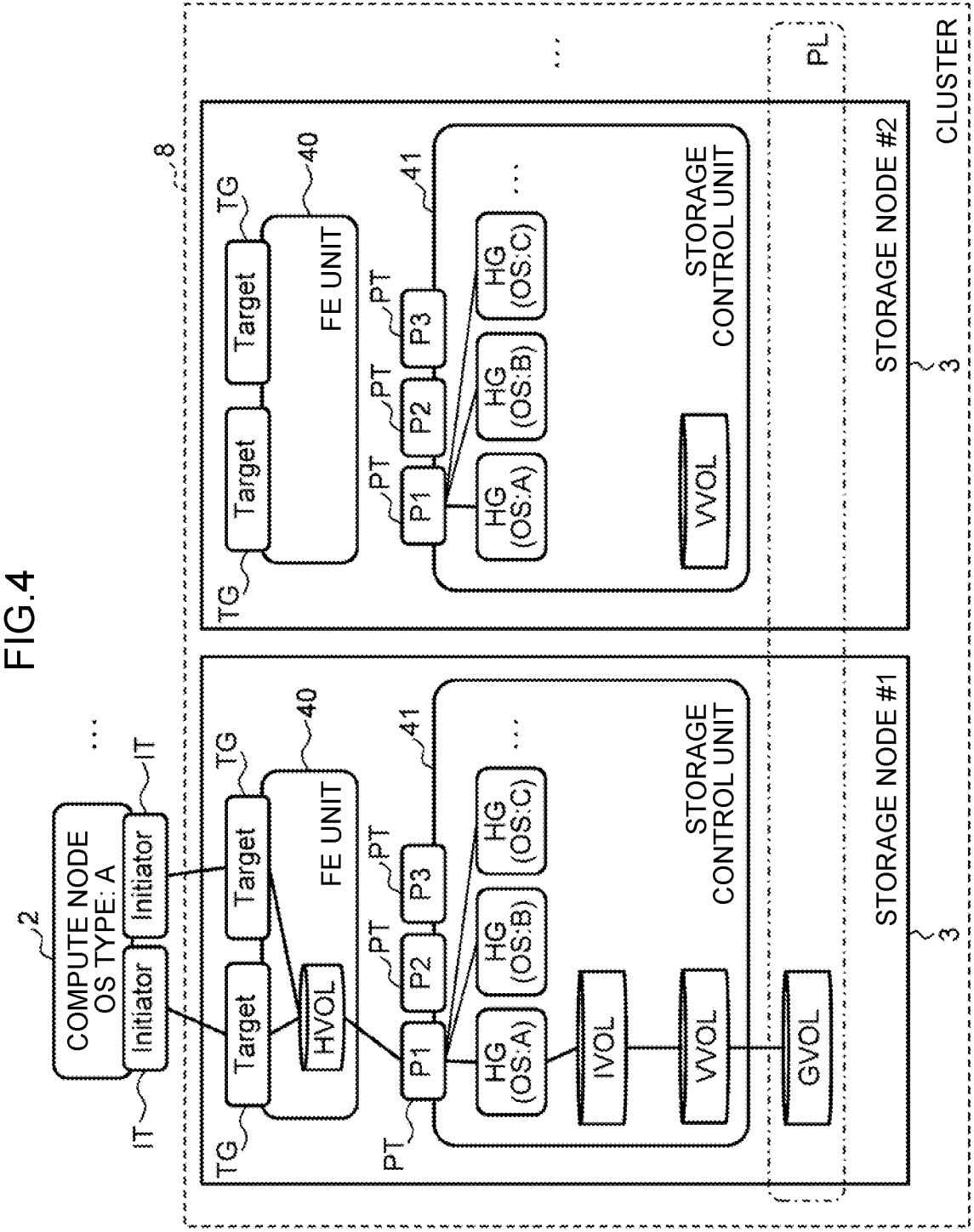
FIG. 4 is a block diagram showing a configuration example of volume paths in storage nodes.

FIG. 4 shows a configuration example of volume paths in storage node 3 of this information processing system 1. As shown in FIG. 4, in the information processing system 1, targets TG are defined in the front-end unit 40 by being mapped one-to-one to each of the physical ports (not shown)

of the storage node 3, and the host volumes HVOL are mapped one-to-one to these targets TG. The host volumes HVOL are volumes which are provided to the compute nodes 2 as a storage area for reading/writing data.

Furthermore, the host volumes HVOL are mapped to internal volumes IVOL which are virtual volumes managed by the storage control unit 41 via virtual ports PT which have been defined in the storage control unit 41.

More precisely, the storage control unit 41 creates a plurality of host groups HG by mapping same to each OS type supported by its own node respectively. Thereupon, the required functions are mapped to each host group HG upon processing commands (including I/O requests) from the compute nodes 2 of the OS type which corresponds to the host group HG, respectively. Furthermore, for each host group HG, the storage control unit 41 creates one or a plurality of internal volumes IVOL by associating same with the host group HG.

Furthermore, among the internal volumes IVOL which are associated with these host groups HG, the host volumes HVOL are mapped in a one-to-one or one-to-many relationship to the internal volumes IVOL which are associated with the host group HG corresponding to the OS type of the OS installed on the compute node 2 provided by the host volume HVOL (hereinafter called the OS type of the compute node 2).

Moreover, one or a plurality of virtual volumes VVOL which are virtual logical volumes created by the storage control unit 41 is mapped to the internal volume IVOL, and a physical storage area is dynamically allocated from the storage device 12 (FIG. 2) to the virtual volume VVOL.

Furthermore, the virtual volumes VVOL are mapped one-to-one to global volumes GVOL which have been defined in the scale-out databases 24 (FIG. 3). Further, the global volumes GVOL in the cluster 8 are each collected and managed as one pool PL which intersects all the storage nodes 3 in the cluster 8.

Meanwhile, on the compute node 2 side, a plurality of storage nodes 3 which form the cluster 8 appear as one storage apparatus, and the storage apparatus recognizes the host volumes HVOL as the storage area which is provided to its own nodes.

However, the host volumes HVOL which can be recognized by each compute node 2 are only those host volumes HVOL which have been configured in the compute node 2 by the system administrator via the management terminal 4. Accordingly, the compute node 2 recognizes only the host volumes HVOL which have been configured via the management terminal 4 as the storage area which has been provided by the storage apparatus.

Furthermore, the compute nodes 2 each manage a path from each initiator IT which has been configured as a physical port (not shown) of its own node to a target TG which has been configured as a physical port of any storage node 3 in the cluster 8. Furthermore, when reading/writing data from/to a desired host volume HVOL, the compute node 2 sends an I/O request which designates an identifier of the host volume HVOL, a read/write destination address in the host volume HVOL and a data length of the target data to the target TG recognized by its own node.

Upon receiving the I/O request from the compute node 2, the front-end unit 40 of the storage node 3 refers to the volume path management table 27, described subsequently with reference to FIG. 10, and specifies the virtual volume VVOL which has been mapped via an internal volume IVOL to the host volume HVOL designated in the I/O request and the storage node 3 where the storage control unit 41 managing the virtual volume VVOL is disposed, respectively.

Furthermore, when the specified storage node 3 is its own node, the front-end unit 40 rewrites the volume number of the host volume HVOL which is the data read/write destination designated in the I/O request, with the volume number of the corresponding internal volume IVOL which has been mapped to the host volume HVOL, before transferring the I/O request to the corresponding storage control unit 41 in its own node (the storage control unit 41 managing the internal volume IVOL).

However, when the specified storage node 3 is another storage node 3, the front-end unit 40 transfers the I/O request to that storage node 3 via the back-end network 7. Furthermore, the front-end unit 40 of the storage node 3 to which the I/O request has been transferred rewrites the volume number of the host volume HVOL which is the read/write destination contained in the I/O request, with the volume number of the internal volume IVOL which has been mapped to the host volume HVOL, before transferring the I/O request to the corresponding storage control unit 41 in its own node.

The storage control unit 41 which has received the I/O request refers to a management table (not shown), in which the storage area in the internal volume IVOL and storage area in the virtual volume VVOL are mapped, to specify the virtual volume VVOL and the storage area in the virtual volume VVOL which have been mapped to the internal volume IVOL designated as the data read/write destination in the I/O request and the storage area in the internal volume IVOL.

Furthermore, when the I/O request is a write request, the storage control unit 41 allocates storage area from the storage device 12 as required to the storage area specified in the specified virtual volume VVOL and stores the write target data in the allocated storage area. Furthermore, when the I/O request is a read request, the storage control unit 41 reads data from the storage area in the storage device 12 which has been allocated to the specified storage area in the specified virtual volume VVOL, and transfers the data thus read to the compute node 2 which is the transmission source of the read request via the front-end unit 40.

Thereupon, the storage control unit 41 also specifies the host group HG to which the internal volume IVOL designated as the data read/write destination in the I/O request has been allocated. Further, upon processing the I/O request as described above, the storage control unit 41 switches the operation content to utilize a function that has been configured for the specified host group HG. Thus, in the information processing system 1, the internal operation of the cluster 8 is switched according to the OS type of the compute node 2 which is the transmission source of the I/O request.

(3) Volume Path Automatic Configuration Function (3-1) Overview of Volume Path Automatic Configuration Function and Configuration of Each Related Table.

A volume path automatic configuration function which has been installed in each storage node 3 of this information processing system 1 will be explained next. This volume path automatic configuration function is a function which automatically configures a volume path from the host volume HVOL provided in the compute node 2 to the virtual volume VVOL mapped to the global volume GVOL as a result of the system administrator operating the management terminal 4 to instruct configuration of the volume path from the desired compute node 2 to the desired global volume GVOL.

In reality, in the information processing system 1, when storage area in the cluster 8 is allocated as storage area for reading/writing data from/to a new compute node 2 such as when the information processing system 1 is introduced, for example, an accessible host volume HVOL is configured for the compute node 2.

Furthermore, the compute node 2 must first be registered for the cluster 8 and subsequently it is necessary to create a host volume HVOL which is provided to the compute node 2, an internal volume IVOL which is mapped to the host volume HVOL, and a virtual volume VVOL which is mapped to both the internal volume IVOL and the global volume GVOL. Furthermore, the internal volume IVOL is mapped to the host group HG which corresponds to the OS type of the compute node 2, and a function according to the OS type to which the host group HG is mapped must also be configured for each host group HG.

Regarding this point, in the information processing system 1, the global volume GVOL and the virtual volume VVOL which is mapped one-to-one to the global volume GVOL can be created in any storage node 3 in the cluster 8 as a result of the system administrator operating the management terminal 4 to instruct the creation of the global volume GVOL.

Moreover, in the information processing system 1, as a result of the system administrator operating the management terminal 4 to register a new compute node 2, designate the name of the compute node 2 (compute node name), an identification number (volume number) of the host volume HVOL which the compute node 2 recognizes as storage area, and the volume number of the global volume GVOL mapped to the host volume HVOL, and to instruct creation of a volume path from the host volume HVOL to the global volume GVOL, a volume path from the host volume HVOL to the virtual volume VVOL which was created mapped to the global volume GVOL can subsequently be automatically configured by mapping the function according to the OS type of the compute node 2 (volume path automatic configuration function).

As means for implementing such a volume path automatic configuration function, the tables shown in FIGS. 5 to 11 are suitably created and used in the corresponding storage node 3 during the execution of serial processing based on the volume path automatic configuration function (hereinafter volume path automatic configuration processing).

Among these tables, the DB-side compute node management table 30 shown in FIG. 5 is a table which is used to manage OS types of the compute nodes 2 among the various information relating to the compute nodes 2 (hereinafter called compute node information) which is input when the system administrator uses the management terminal 4 to register the compute nodes 2 in the cluster 8. This DB-side compute node management table 30 is a table which forms part of the scale-out database 24 (FIG. 3) and is created by the cluster management unit 42 (FIG. 3).

As shown in FIG. 5, the DB-side compute node management table 30 is configured by comprising a compute node name field 30A, an OS type field 30B, and a volume path management table number field 30C. In the DB-side compute node management table 30, one entry (row) corresponds to one registered compute node 2.

Furthermore, the compute node name field 30A stores the names of the corresponding compute nodes (compute node names), and the OS type field 30B stores the names of OS types of the OS installed on the compute nodes 2 which have been registered for the compute nodes 2. Furthermore, the volume path table number field 30C stores identification numbers (hereinafter called volume path management table numbers) of the DB-side volume path management table 31, described subsequently with reference to FIG. 6, which have been created for the corresponding compute nodes 2.

Accordingly, in the case of the example of FIG. 5, it can be seen that an OS with the OS type name 'A' has been installed on the compute node 2 with the compute node name 'Compute01,' the compute node 2 and that the volume path management table number of the DB-side volume path management table 31 which was created mapped to the compute node 2 is '#1.'

Furthermore, the DB-side volume path management table 31 shown in FIG. 6 is created for each registered compute node 2 and is used to manage the volume path from the host volume HVOL provided to the corresponding compute node 2 to the virtual volume VVOL mapped to the host volume HVOL (the virtual volume VVOL which was created mapped to the global volume mapped to the compute node 2). This DB-side volume path management table 31 is a table which forms part of the scale-out database 24 (FIG. 3) and is created by the cluster management unit 42 (FIG. 3).

As shown in FIG. 6, the DB-side volume path management table 31 is configured by comprising a global volume field 31A, a host volume field 31B, a storage control unit field 31C, a virtual volume field 31D and an internal volume field 31E. In the DB-side volume path management table 31, one entry (row) corresponds to a volume path from one host volume HVOL to one virtual volume VVOL (global volume GVOL).

Furthermore, the global volume field 31A stores the identifier (volume number) of the global volume GVOL which has been created mapped to the corresponding compute node 2 and the virtual volume field 31D stores the volume number of the virtual volume which has been created mapped to the global volume GVOL.

Furthermore, the host volume field 31B stores the volume numbers of the host volumes HVOL which are coupled by means of corresponding volume paths to the corresponding virtual volumes VVOL, and the storage control unit field 31C stores the identifiers of the storage control units 41 which create and manage the virtual volumes VVOL. Furthermore, the internal volume field 31E stores the volume numbers of the internal volumes IVOL which have been created between the corresponding host volumes HVOL and virtual volumes VVOL.

Accordingly, in the case of the example of FIG. 6, it can be seen, for example, that the virtual volume VVOL, which has been assigned a virtual volume number '1' and which is mapped to the global volume GVOL to which the global volume number '1' is assigned, was created by the storage control unit 41 which has been assigned the identifier '1,' and that the virtual volume VVOL is coupled to the host volume HVOL which has been assigned the volume number '1' via the internal volume IVOL of a volume number '1.'

Meanwhile, the mode parameter table 28 shown in FIG. 7 is a table which is used to manage mapping relationships between functions which are installed on the storage nodes 3 and parameters which have been mapped in advance to these functions (hereinafter called mode parameters) and is created and managed by the storage control unit 41. As shown in FIG. 7, the mode parameter table is configured by comprising a mode parameter field 28A and a function field 28B.

Further, the function field 28B stores the function names of each of the functions installed on the storage nodes 3 and the mode parameter field 28A stores the values of the mode parameters which have been mapped to the corresponding functions.

Accordingly, in the case of the example of FIG. 7, it can be seen, for example, that the mode parameters '1,' '2,' and '3' have been mapped to 'function A,' 'function B' and 'function C,' respectively.

The OS type table 25 shown in FIG. 8 is a table which is used to manage mapping relationships between the OS types supported by the storage nodes 3, the host groups HG to which compute nodes 2 of the OS types are mapped, and the functions to be configured for the volume paths which are coupled to the compute nodes 2 belonging to the host groups HG and is created and managed by the storage control units 41.

As shown in FIG. 8, the OS type table 25 is configured by comprising an OS type field 25A, a host group number field 25B, and a mode parameter field 25C. In the OS type table 25, one entry (row) corresponds to one OS type.

Further, the OS type field 25A stores the names of all the OS types (OS type names) which are supported by the storage nodes 3 holding the OS type table 25, and the host group number field 25B stores the identification numbers of the host groups HG (host group numbers) to which the compute nodes 2 of the OS types are to be mapped. Moreover, the mode parameter field 25C stores the mode parameters of each of the functions to be configured for the volume paths which are coupled to the compute nodes 2 of the corresponding OS types.

Accordingly, in the case of the example of FIG. 8, it can be seen, for example, that the OS of the OS type 'A' has been mapped to the host group HG which has been assigned the host group number '0' and that the functions which correspond to each of the mode parameters '1,' '2,' and '3' are to be configured for compute nodes where an OS of that OS type has been installed.

The compute node management table 26 shown in FIG. 9 is a table which the front-end unit 40 (FIG. 3) uses to manage the host groups HG to which the registered compute nodes 2 belong and is created and managed by the front-end unit 40. As shown in FIG. 9, this compute node management table 26 is configured by comprising a compute node name field 26A and a host group number field 26B. The compute node management table 26 is created and managed by the front-end unit 40.

Furthermore, the compute node name field 26A stores the compute node names of all the registered compute nodes 2 and the host group number field 26B stores the host group numbers of the host groups HG to which the corresponding compute nodes 2 belong.

Accordingly, in the case of the example of FIG. 9, it can be seen that the compute node 2 which has the compute node name 'Compute01' is managed in the storage node 3 as belonging to the host group HG which has been assigned the host group number '0' according to the OS type of the OS installed on the compute node 2.

In addition, the volume path management table 27 shown in FIG. 10 is a table which the front-end unit 40 uses to manage the configuration of the volume paths which are mapped to each of the registered compute nodes 2 and is created and managed by the front-end unit 40. As shown in FIG. 10, the volume path management table 27 is configured by comprising a compute node name field 27A, a host volume field 27B, and an internal volume field 27C.

Furthermore, the compute node name field 27A stores the compute node names of all the registered compute nodes 2 and the host volume field 27B stores the volume numbers of the host volumes HVOL which have been mapped to the corresponding compute nodes 2. Furthermore, the internal volume field 27C stores the volume numbers of the internal volumes IVOL which have been mapped to the corresponding host volumes HVOL.

Accordingly, in the case of the example of FIG. 10, it can be seen that the host volume HVOL which has been assigned the volume number '1' is mapped to the compute node 2 with the compute node name 'Compute01,' and that the internal volume IVOL which has been assigned the volume number '1' is mapped to the host volume HVOL.

The HG-IVOL management table 29 shown in FIG. 11 is a table which is used to manage mapping relationships between the host groups HG and internal volumes IVOL and is created and managed by the storage control unit 41 (FIG. 3). As shown in FIG. 11, the HG-IVOL management table 29 is configured by comprising an internal volume field 29A and a host group number field 29B.

Furthermore, the internal volume field 29A stores the volume numbers of each of the internal volumes IVOL which have been created in the storage node 3 and the host group number field 29B stores the host group numbers of the host groups HG which have been mapped to the corresponding internal volumes IVOL.

Accordingly, in the case of the example of FIG. 11, it can be seen, for example, that the internal volume IVOL which has been assigned the volume number '1' and the internal volume IVOL which has been assigned the volume number '2' are mapped to the host group HG which has been assigned the host group number '0' and that the internal volume IVOL which has been assigned the volume number '3' and the internal volume IVOL which has been assigned the volume number '4' are mapped to the host group HG which has been assigned the host group number '8.'

Figure 12:
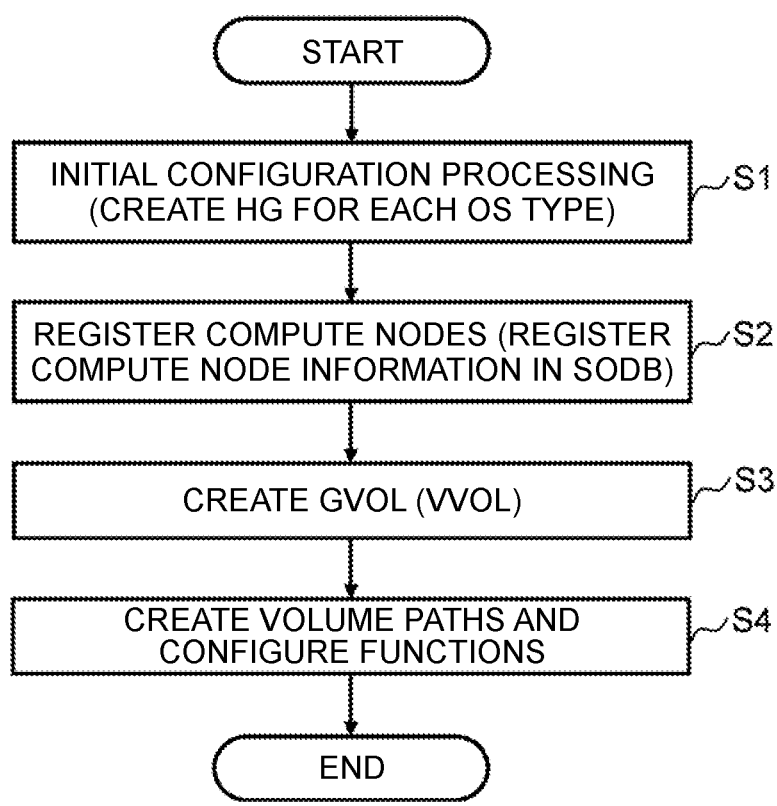
FIG. 12 is a flowchart showing the flow of serial processing relating to a volume path automatic configuration function.
Figure 13:
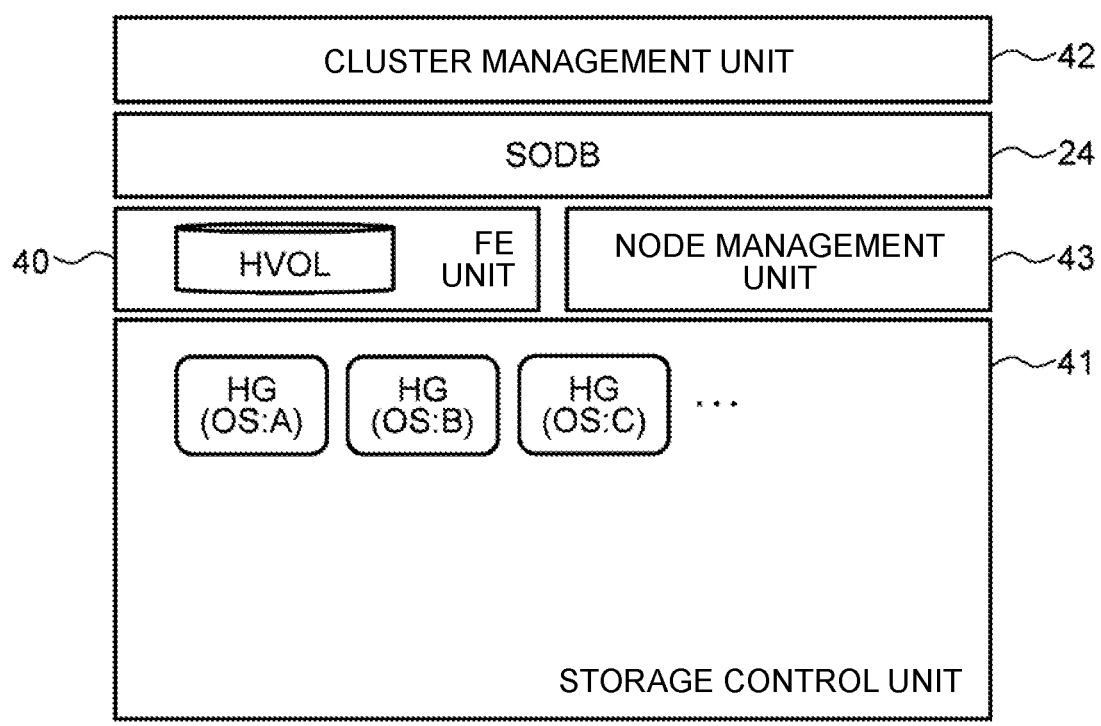
FIG. 13 is a conceptual drawing serving to explain the flow of serial processing relating to the volume path automatic configuration function.

(3-2) Flow of Various Processing Relating to Volume Path Automatic Configuration Function (3-2-1) Flow of Basic Processing Relating to Volume Path Automatic Configuration Function FIG. 12 shows the flow of serial processing which is executed in the cluster 8 in relation to the aforementioned volume path automatic configuration function. This processing is started by activating each of the storage nodes 3 forming the cluster 8 after the information processing system 1 has been newly introduced. As shown in FIG. 13, after activation of its own node, the storage control unit 41 of the storage node 3 creates a host group HG for each of the OS types supported by its own node and executes initial configuration processing to configure, for each host group HG, each of the functions according to the OS type corresponding to the host group HG (S1).

Thereafter, the system administrator operates the management terminal 4 to input information (hereinafter called compute node information) such as an identifier and name of each compute node 2 which the information processing system 1 comprises, an initiator name, and the OS type of the installed OS. As a result, the compute node information of each of the compute nodes 2 is supplied from the management terminal 4 to the master cluster management unit 42 and stored in the scale-out database 24 (FIGS. 2, 3). Here, the compute node names of each of compute nodes 2 and the OS types of the OS installed on these compute nodes 2 are registered in the DB-side compute node management table 30 (FIG. 5) of each storage node 3 (S2).

Figure 14:
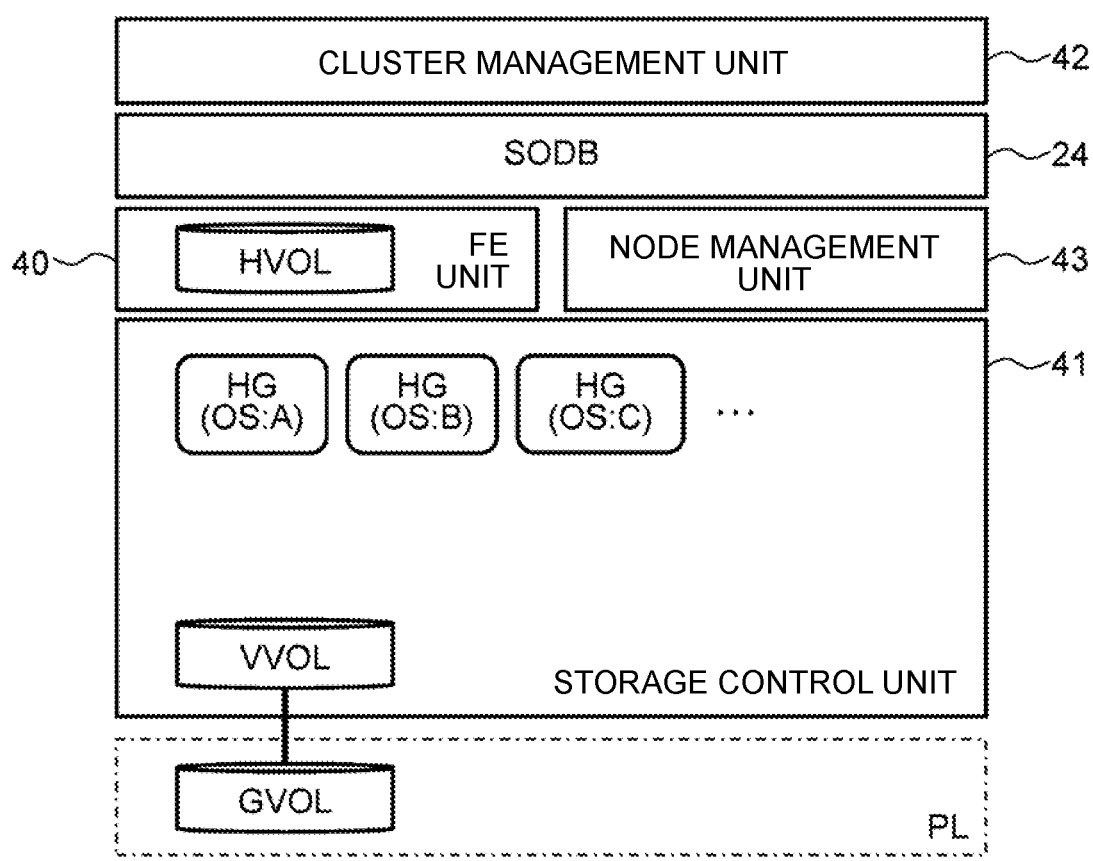
FIG. 14 is a conceptual drawing serving to explain the flow of serial processing relating to the volume path automatic configuration function.

The system administrator then operates the management terminal 4 to instruct the creation of a global volume GVOL of the desired capacity. As a result, this instruction is sent from the management terminal 4 to the master cluster management unit 42, the requested global volume GVOL is created in the cluster 8 as shown in FIG. 14 under the control of the master cluster management unit 42, and a virtual volume VVOL of the designated capacity which is mapped one-to-one to the global volume GVOL is created in any of the storage nodes 3 of the cluster 8 (S3).

The system administrator then operates the management terminal 4 to instruct the creation of a volume path from the desired host volume HVOL in the cluster 8 to the desired global volume GVOL. Thereupon, the system administrator designates the compute node name of the compute node 2 providing the host volume HVOL, the volume number of the global volume GVOL, and the volume number of the host volume HVOL.

As a result, this instruction (hereinafter called the volume path creation instruction) is sent from the management terminal 4 to the master cluster management unit 42, and the volume path designated by the volume path creation instruction is created under the control of the master cluster management unit 42 (S4).

Figure 15:
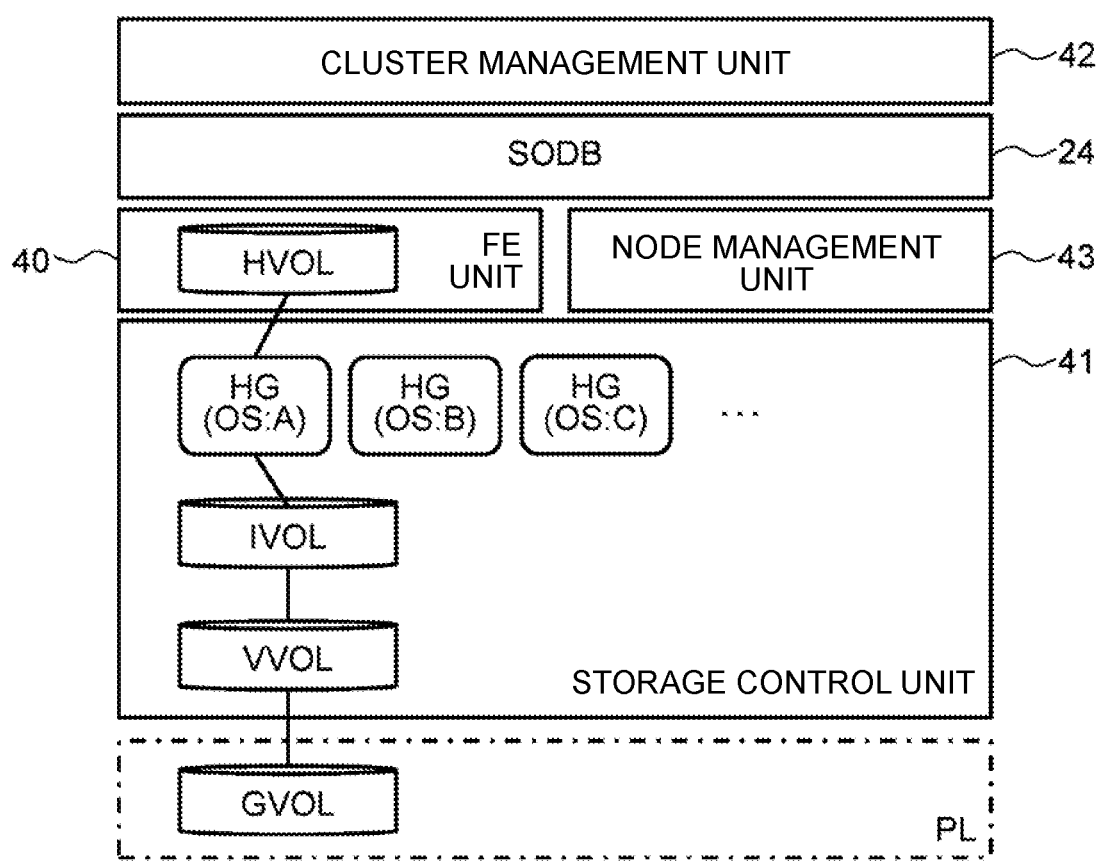
FIG. 15 is a conceptual drawing serving to explain the flow of serial processing relating to the volume path automatic configuration function.

Specifically, as shown in FIG. 15, an internal volume IVOL which is mapped to the host group HG corresponding to the OS type of the compute node 2 that was designated in the volume path creation instruction is created in the storage node 3 in which the virtual volume VVOL was created. Furthermore, a volume path from the host volume HVOL designated in the volume path creation instruction to the virtual volume VVOL which is mapped to the global volume GVOL designated in the volume path creation instruction, via the internal volume IVOL created as described above, is subsequently configured. As a result, at the same time as the volume path is configured, a function according to the OS type of the compute node 2 designated in the volume path creation instruction is configured for the volume path.

As a result of the foregoing, serial processing relating to the volume path automatic configuration function of this embodiment is complete.

Figure 16:
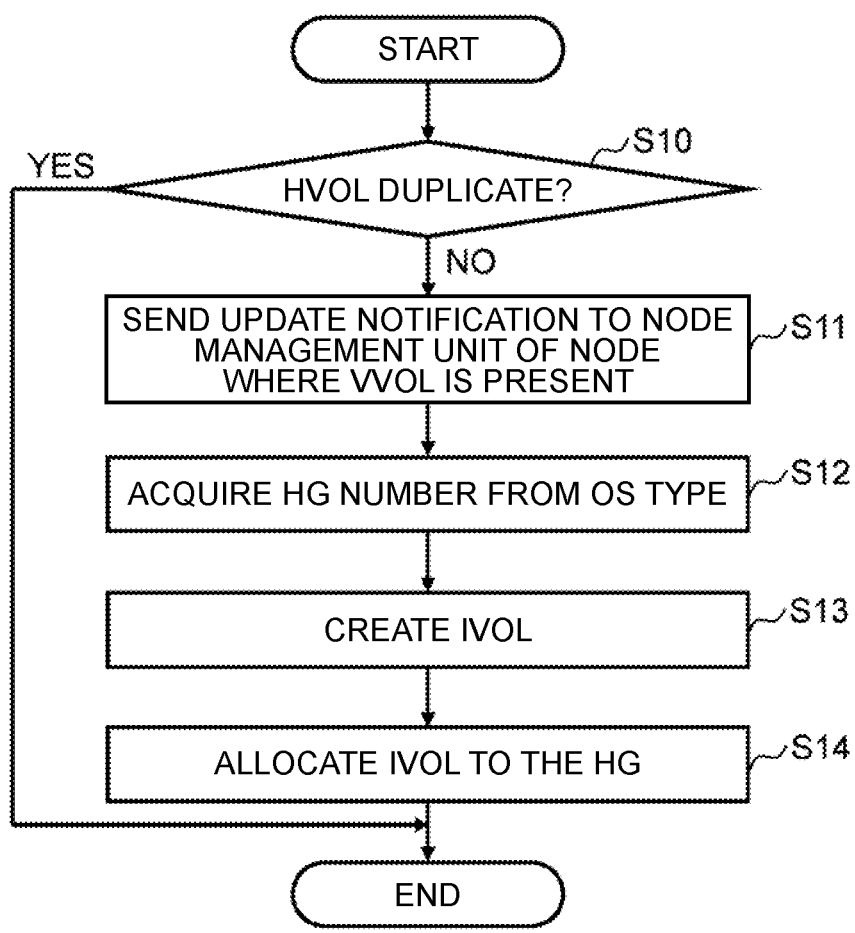
FIG. 16 is a flowchart showing the flow of volume path creation processing.

FIG. 16 shows the specific flow of processing that is performed in cluster 8 in step S4 of FIG. 12 (hereinafter this processing is called volume path creation processing). When the master cluster management unit 42 receives this volume path creation instruction, the volume path creation processing shown in FIG. 16 is started.

Furthermore, the master cluster management unit 42 first refers to the DB-side volume path management table 31 of the scale-out database 24 to determine whether or not a combination of the compute node name of the compute node 2 and the volume number of the host volume HVOL, designated in the volume path creation instruction, has already been registered in the DB-side volume path management table 31 (S10).

When an affirmative result is obtained in the determination of step S10, the master cluster management unit 42 sends an error notification to that effect to the management terminal 4. Thus, in the foregoing case, the volume path creation processing ends.

However, when a negative result is obtained in the determination of step S10, the master cluster management unit 42 sends an update notification to the node management unit 43 (FIG. 3) of the storage node 3 of the virtual volume VVOL created in step S3 of FIG. 12 mapped to the global volume GVOL designated in the volume path creation instruction (S11).

Further, the node management unit 43 which has received the update notification acquires the host group number of the host group HG that was created mapped to the OS type of the compute node 2 serving as the volume path coupling destination by referring to the DB-side compute node management table 30 (FIG. 5) of the scale-out database 24 and the OS type table 25 under its own management (FIG. 8) (S12).

More specifically, the node management unit 43 acquires the OS type of the OS installed on the compute node 2, which is the coupling destination of the volume path whose creation has been instructed, from the DB-side compute node management table 30 and acquires the host group number of the host group HG mapped to this OS type from the OS type table 25.

Thereafter, the node management unit 43 issues an instruction to the storage control unit 41 in its own node to create an internal volume IVOL mapped to this host group HG. Thus, the storage control unit 41 to which the instruction was supplied creates an internal volume IVOL which has an unused volume number assigned thereto and which is mapped to the host group HG and stores the volume number of the internal volume IVOL in the internal volume field 29A of an unused row of the HG-IVOL management table 29 (FIG. 11) (S13).

Further, the storage control unit 41 also subsequently allocates the internal volume IVOL created at this time to the host group HG whose host group number was acquired in step S12 (S14). More specifically, the storage control unit 41 stores the host group number acquired in step S12 in the host group number field 29B of the row where the volume number was stored in the internal volume field 29A in step S13 among each of the rows of the HG-IVOL management table 29.

Furthermore, the master cluster management unit 42 then registers the volume number of the internal volume IVOL created in step S13 in the DB-side volume path management table 31, mapped to the volume number of the host volume HVOL and the volume number of the global volume GVOL which were designated in the volume path creation instruction, the volume number of the virtual volume VVOL which was created mapped to the global volume GVOL, and the identification number of the storage control unit 41 which creating and managing the virtual volume VVOL.

As a result of the foregoing, the volume path creation processing ends.

(3-2-2) Specific Flow of Each Processing Relating to Volume Path Automatic Configuration Function.

(3-2-2-1) Flow of Initial Configuration Processing

Figure 17:
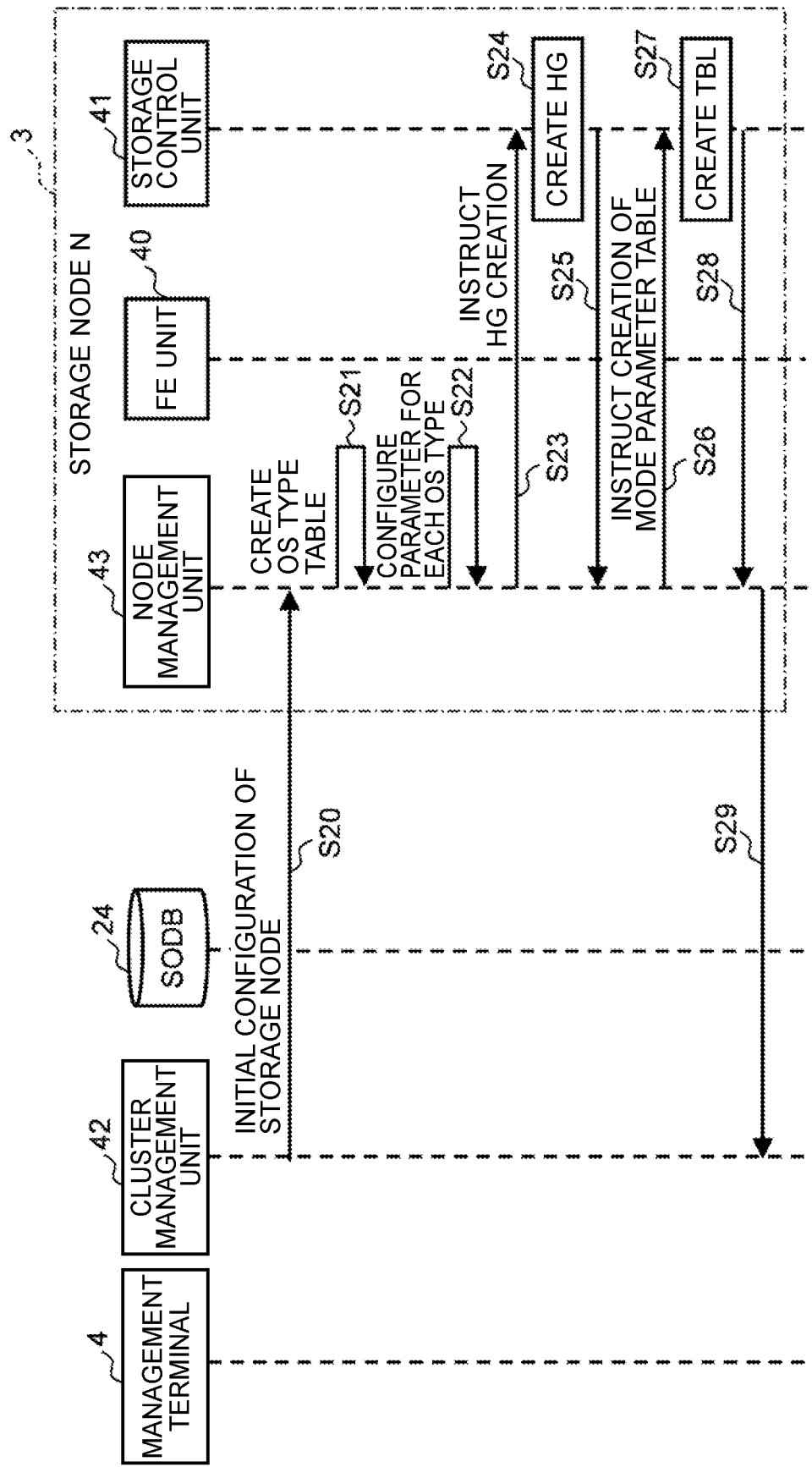
FIG. 17 is a sequence diagram showing the flow of initial configuration processing.

Here, FIG. 17 shows the flow of initial configuration processing which is executed in step S1 of FIG. 12. In this step S1, the master cluster management unit 42 among the cluster management units 42 which are mounted in each storage node 3 first supplies an instruction to execute initial configuration of the storage node 3 to the node management unit 43 of each storage node 3 in the same cluster 8 (S20).

The node management unit 43 of the storage node 3 which has received this instruction then creates the OS type table 25 which was described earlier with reference to FIG. 8 based on data held beforehand (S21). More specifically, the node management unit 43 holds information beforehand relating to each of the OS types supported by its own node and functions which are to be configured for each of these OS types. Further, the node management unit 43 stores the names of each of the supported OS types in the OS type field 25A (FIG. 8) in different rows based on this information and stores host group numbers which are assigned so that these OS types are not duplicated in the host group number field 25B (FIG. 8) in the corresponding rows.

The node management unit 43 then stores each of the mode parameters corresponding to each function to be configured for the corresponding OS type in each mode parameter field 25C (FIG. 8) in the OS type table 25 (S22). The OS type table 25 is thus completed.

Thereafter, the node management unit 43 issues an instruction to the storage control unit 41 to create host groups HG which are mapped to each of the OS types supported by its own node (S23). Thus, the storage control unit 41 which has received this instruction creates host groups HG which are mapped to each OS type supported by its own node (S24) and then sends a completion notification to the effect that the creation of the host groups HG is complete to the node management unit 43 (S25).

Furthermore, upon receiving this completion notification, the node management unit 43 issues an instruction to the storage control unit 41 to create the mode parameter table 28 (FIG. 7) (S26). The storage control unit 41 which has received this instruction thus creates the mode parameter table 28 based on information held beforehand (S27) and then sends a completion notification to the effect that the creation of the mode parameter table 28 is complete to the node management unit 43 (S28).

Thus, upon receiving this completion notification, the node management unit 43 sends a completion notification to the effect that initial configuration is complete to the master cluster management unit 42 (S29). As a result of the foregoing, the initial configuration processing described earlier with reference to step S1 of FIG. 12 ends.

(3-2-2-2) Flow of Compute Node Registration Processing

Figure 18:
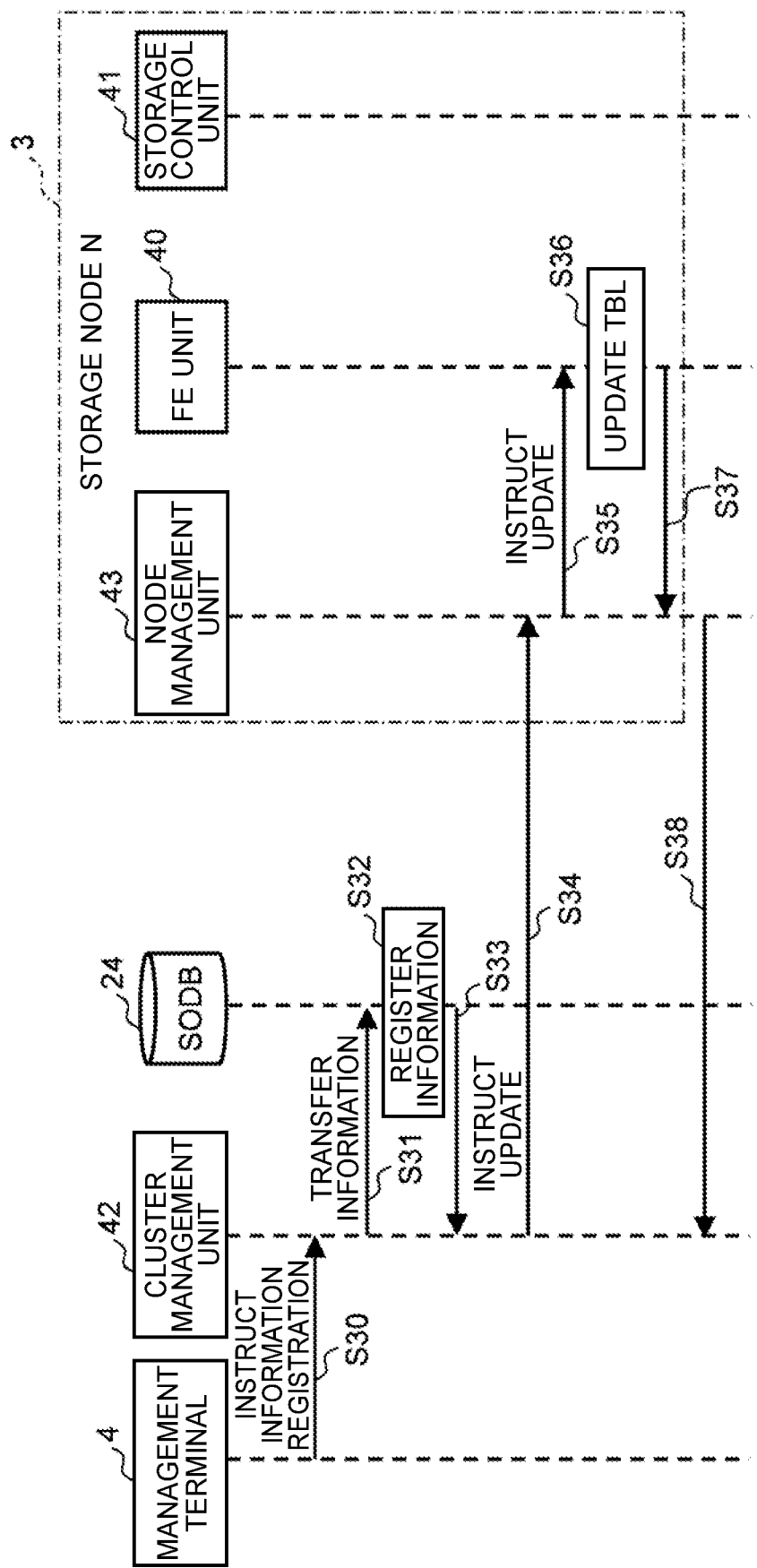
FIG. 18 is a sequence diagram showing the flow of compute node registration processing.

Meanwhile, FIG. 18 shows the flow of compute node registration processing which is executed in step S2 of FIG. 12. In step S2, the system administrator first operates the management terminal 4 to input compute node information of each compute node 2 forming the information processing system 1 and instruct the registration of the compute notes 2. As a result, the compute node information of each of the compute nodes 2 input at this time is sent together with the registration instruction from the management terminal 4 to the master cluster management unit 42 (S30).

The master cluster management unit 42 which has received the compute node information and the registration request transfers the compute node information of each of the compute nodes 2 received at this time to the scale-out database 24 (S31).

The scale-out database 24 thus registers the compute node information of each of the compute nodes 2 in the required tables (S32). For example, the scale-out database 24 registers the compute node names and OS types of each of the compute nodes 2 which have been supplied from the master cluster management unit 42 in the DB-side compute node management table 30 (FIG. 5). Furthermore, upon completing registration of the compute node information of each compute node 2 in the required tables, the scale-out database 24 sends a completion notification to that effect to the cluster management unit 42 (S33).

Upon receiving this completion notification, the master cluster management unit 42 sends an update instruction to the effect that the compute node management table 26 (FIG. 9) is to be updated to the node management unit 43 of each storage node 3 (S34). The update instruction includes the compute node name of each compute node 2 registered at the time which is contained in the compute node information and the host group number of the host group HG mapped to the OS type of the compute node 2.

Upon receiving this update instruction, the node management unit 43 designates, for the front-end unit 40 in its own node, each compute node name and host group number which are contained in the update instruction and instructs an update to the compute node management table 26 (FIG. 9) which is managed by the front-end unit 40 (S35).

Furthermore, the front-end unit 40 which has received this instruction updates the compute node management table 26 to store each compute node name designated in the then supplied instruction in the compute node name field 26A (FIG. 9) of the compute node management table 26 under its own management and to store the corresponding host group numbers mapped to these compute node names in the host group number field 26B (FIG. 9) (S36), and then sends a completion notification to the effect that the update is complete to the node management unit 43 (S37).

Further, the node management unit 43 which has received this completion notification sends a completion notification to the effect that the update to the compute node management table 26 is complete to the master cluster management unit 42 (S38). As a result of the foregoing, the compute node registration processing described hereinabove with reference to step S2 of FIG. 12 is complete.

(3-2-2-3) Flow of Volume Creation Processing

Figure 19:
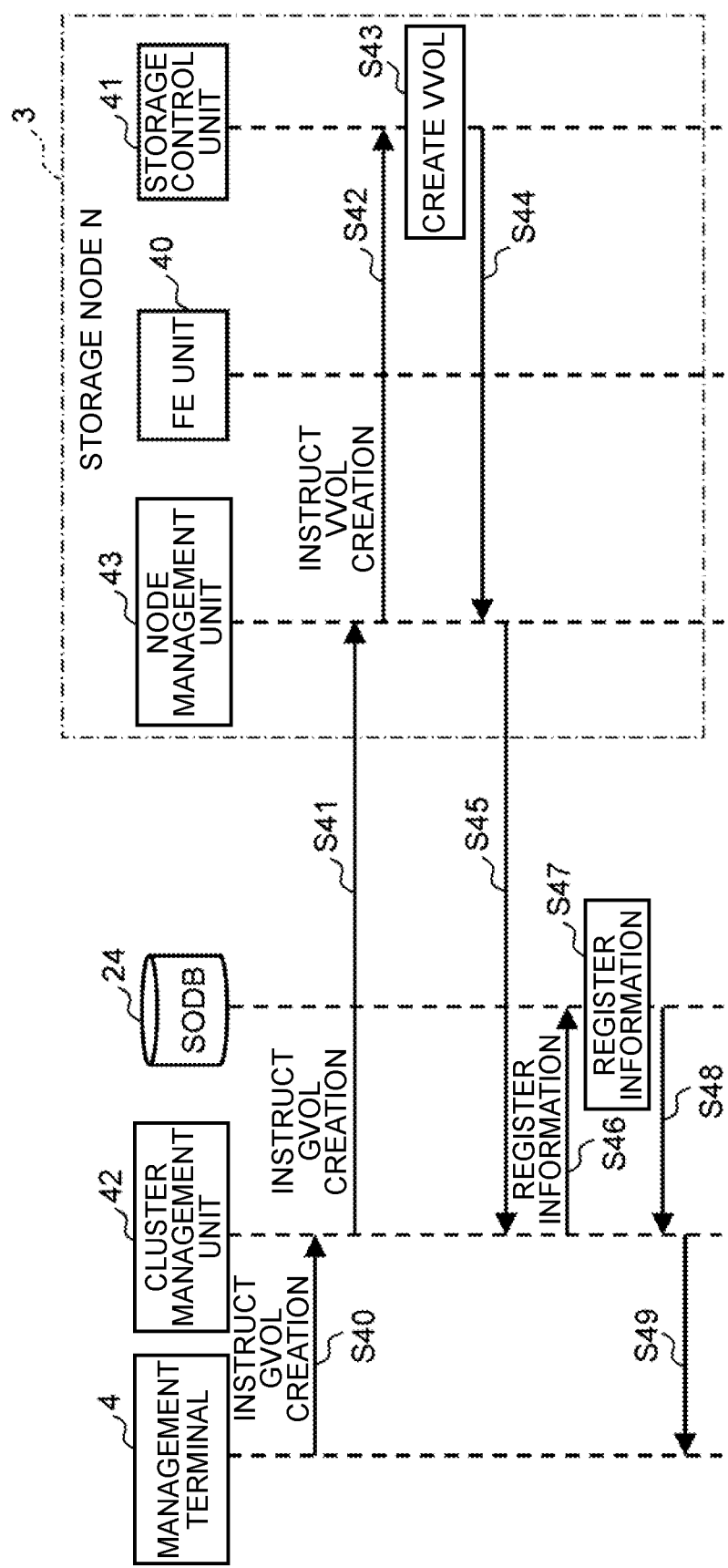
FIG. 19 is a sequence diagram showing the flow of volume creation processing.

Meanwhile, FIG. 19 shows the flow of volume creation processing which is executed in step S3 of FIG. 12. In this step S3, the system administrator first operates the management terminal 4 to issue an instruction to the master cluster management unit 42 to create a global volume GVOL (S40).

Upon receiving this instruction, the master cluster management unit 42 determines, by considering the load status and remaining capacity and the like of each of the storage nodes 3 forming the cluster 8, one storage node 3 which is capable of creating a virtual volume VVOL mapped to the requested global volume GVOL, among these storage nodes 3, and issues an instruction to the node management unit 43 of this storage node 3 to create the global volume GVOL (S41).

The node management unit 43 which has received this instruction instructs the storage control unit 41 to create the virtual volume VVOL mapped to the requested global volume GVOL (S42). Furthermore, upon receiving the instruction, the storage control unit 41 creates the designated virtual volume VVOL and registers information thereof in a management table for virtual volumes VVOL (not shown) (S43), and then sends a completion notification to the effect that creation of the virtual volume VVOL is complete to the node management unit 43 (S44). Note that the completion notification contains a volume number of the virtual volume VVOL created at this time. Furthermore, upon receiving this completion notification, the node management unit 43 transfers same to the master cluster management unit 42 (S45).

Upon receiving the completion notification, the master cluster management unit 42 transfers information relating to the global volume GVOL created at this time (hereinafter called volume information) to the scale-out database 24 and issues an instruction to register this information in the DB-side volume path management table 31 (FIG. 6) (S46).

Thus, upon receiving this instruction and this volume information, the scale-out database 24 registers the volume information in the corresponding DB-side volume path management table 31 (S47). More specifically, the scale-out database 24 secures an unused row in the DB-side volume path management table 31 and stores the volume number which has been assigned to the global volume GVOL created at this time in the global volume field 31A (FIG. 6) of this row. Furthermore, the scale-out database 24 stores the volume number of the virtual volume VVOL created at this time in the virtual volume field 31D (FIG. 6) of this row and stores the identifier of the storage control unit 41 which created the virtual volume VVOL (the storage control unit number) in the storage control unit field 31C (FIG. 6) of this row.

Furthermore, upon completing registration of this volume information in the DB-side volume path management table 31, the scale-out database 24 issues a completion notification to that effect to the master cluster management unit 42 (S48). Furthermore, upon receiving this completion notification, the master cluster management unit 42 sends a completion notification to the effect that the creation of the requested global volume GVOL is complete to the management terminal 4 (S49). As a result of the foregoing, the volume creation processing described earlier with reference to step S3 of FIG. 12 is complete.

(3-2-2-4) Flow of Volume Path Creation Processing

Figure 20:
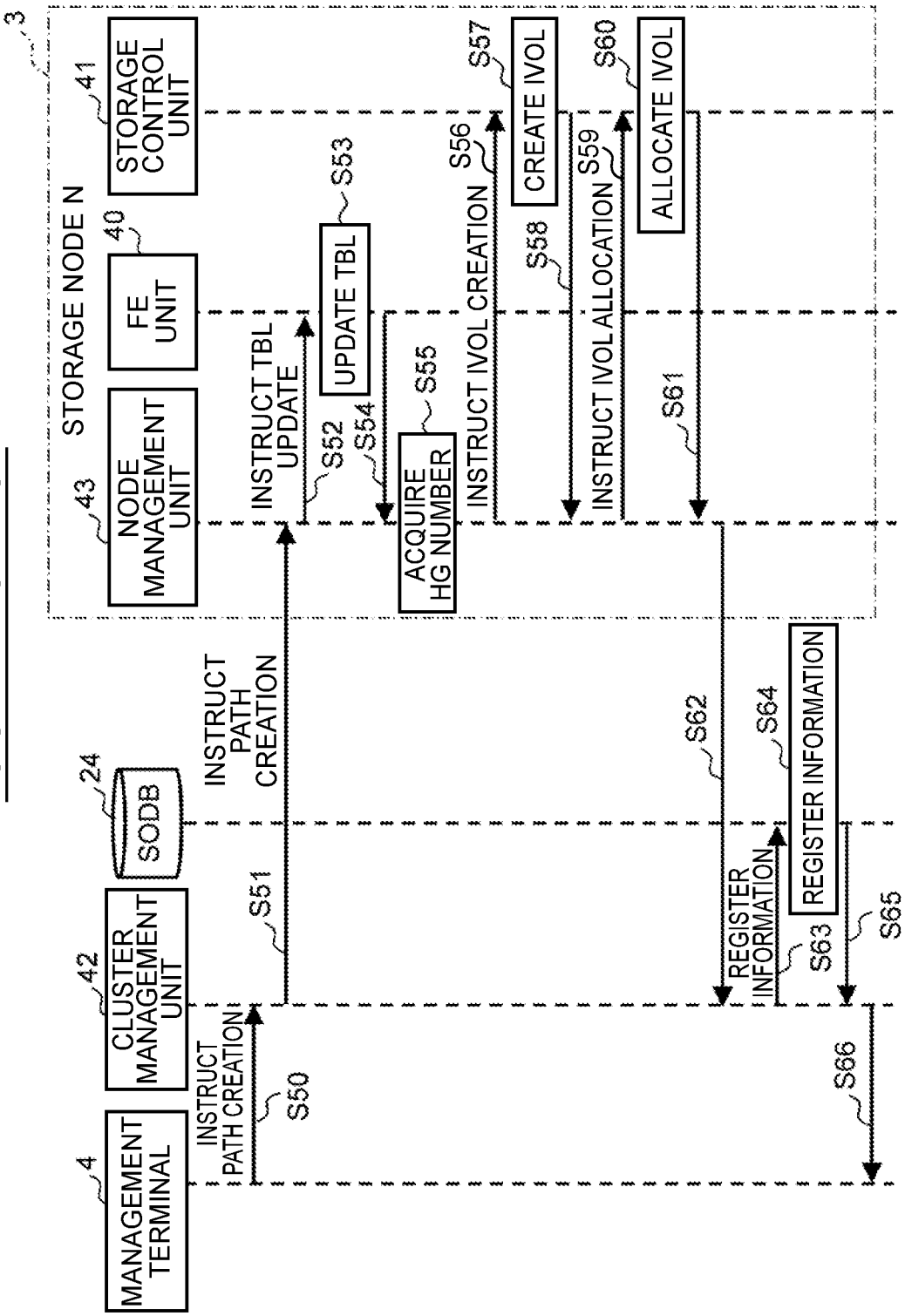
FIG. 20 is a sequence diagram showing the flow of volume path creation processing.

FIG. 20 shows the flow of volume path creation processing which is executed in step S4 of FIG. 12. In this step S4, the system administrator first operates the management terminal 4 to designate the volume number of the host volume HVOL, the volume number of the global volume GVOL mapped to the host volume HVOL, and the compute node name of the compute node 2 providing the host volume HVOL and instructs the creation of a volume path from the host volume HVOL to the global volume GVOL. As a result, the volume path creation instruction which contains the compute node name, the volume number of the host volume HVOL and the volume number of the global volume GVOL is supplied from the management terminal 4 to the master cluster management unit 42 (S50).

Upon receiving this volume path creation instruction, the master cluster management unit 42 issues an instruction to create the corresponding volume path to the node management unit 43 of the storage node 3 in which the virtual volume VVOL mapped to the global volume GVOL designated in the volume path creation instruction was created (S51). Note that this instruction contains the compute node name, the volume number of the host volume HVOL and the volume number of the global volume GVOL which were designated in the volume path creation instruction.

Furthermore, the node management unit 43 which received this instruction instructs the front-end unit 40 of its own node to update the volume path management table 27 (FIG. 10) by designating the compute node name and the volume number of the host volume HVOL which are contained in the instruction of step S51 and the volume number of an internal volume IVOL which is to be created subsequently (S52).

Thus, the front-end unit 40 which has received this instruction secures an unused row of the volume path management table 27 and stores the compute node name, the volume number of the host volume HVOL or the volume number of the internal volume IVOL which are designated in this instruction in the compute node name field 27A (FIG. 10), host volume field 27B (FIG. 10), and internal volume field 27C (FIG. 10) respectively of this row (S53). Further, the node management unit 43 subsequently sends a completion notification to the effect that the update to the volume path management table 27 is complete to the node management unit 43 (S54).

Moreover, the node management unit 43 which has received this completion notification acquires the host group number of the host group HG which was created mapped to the OS type of the compute node 2 which was the volume path coupling destination by means of the method described hereinabove with reference to step S12 of FIG. 16 (S55).

Furthermore, the node management unit 43 issues an instruction to create the internal volume IVOL with the volume number designated by the instruction of step S52 to the storage control unit 41 which creates and manages the virtual volume VVOL which is mapped to the global volume GVOL designated in the volume path creation instruction of step S51 (S56). The storage control unit 41 which has received this instruction thus creates the requested internal volume IVOL so that the information of the interval volume IVOL is registered in a management table (not shown) (S57) and sends a completion notification to that effect to the node management unit 43 (S58).

Furthermore, the node management unit 43 which has received this completion notification instructs the storage control unit 41 to allocate the internal volume IVOL created in step S56 to the host group HG which has been assigned the host group number acquired in step S55 (S59). Note that this instruction contains the host group number of the host group HG that was acquired in step S55.

Thus, the storage control unit 41 which has received this instruction allocates the internal volume IVOL created in step S57 to the host group HG which has been assigned the host group number designated in the instruction (S60). More specifically, the storage control unit 41 secures an unused row in the HG-IVOL management table 29 (FIG. 11), stores the volume number of the internal volume IVOL created in step S57 in the internal volume field 29A (FIG. 11) of this row and stores the host group number designated in the instruction of step S59 in the host group number field 29B of this row. Further, the storage control unit 41 subsequently sends a completion notification for the instruction of step S59 to the node management unit 43 (S61).

Upon receiving this completion notification, the node management unit 43 sends a completion notification to the effect that the creation of the requested volume path is complete to the master cluster management unit 42 (S62). Note that the completion notification contains the volume number of the internal volume IVOL which was created in step S57. Furthermore, the master cluster management unit 42 which has received this completion notification designates the volume number of the internal volume IVOL and issues an instruction to the scale-out database 24 to update the DB-side volume path management table 31 (FIG. 6) (S63).

Thus, the scale-out database 24 which has received this instruction stores the volume number of this internal volume IVOL in the internal volume field 31E (FIG. 6) of the corresponding row among the rows of the DB-side volume path management table 31 (S64). As a result, the registration of the volume path which is created at the time in the DB-side volume path management table 31 is complete.

Furthermore, upon completing this registration, the scale-out database 24 sends a completion notification to that effect to the master cluster management unit 42 (S65). Further, the master cluster management unit 42 which has received this completion notification sends a completion notification to the effect that the requested volume path is complete to the management terminal 4 (S66). As a result of the foregoing, the volume path creation processing described earlier with reference to step S4 of FIG. 12 is complete.

(4) Effect of this Embodiment

As described hereinabove, in the information processing system 1 according to the embodiment, during initial configuration processing, the storage control unit 41 creates the host groups HG mapped to each of the supported OS types and configures, for each host group HG, the functions that are required when processing I/O requests from the compute nodes 2 of the corresponding OS types.

Furthermore, the storage control unit 41 then creates the internal volume IVOL which is interposed between the designated host volume HVOL and virtual volume VVOL according to the volume path creation instruction from the management terminal 4 and allocates the internal volume IVOL to the host group HG according to the OS type of the compute node 2 which is provided by the host volume HVOL.

Further, when an I/O request targeting the corresponding host volume HVOL is supplied from the compute node 2, the storage control unit 41 then executes the I/O processing for the virtual volume VVOL which is coupled via the volume path to this host volume HVOL, while using the function that was configured for the host group HG to which the internal volume IVOL in the volume path was allocated.

Accordingly, in the information processing system 1, when registering the compute node 2 in the cluster 8, the system administrator may configure only the host volume HVOL which is mapped to the compute node 2 and the OS type of the compute node 2, and the work to configure configuration information that has conventionally been required, such as the creation of a host group HG for each OS type, the linking of volumes to each host group HG, and the linking of each compute node 2 to the host groups HG, can be omitted.

Accordingly, with the information processing system 1, it is possible to facilitate configuration work when the information processing system 1 is introduced or when a new compute node 2 is introduced and to improve user-friendliness by reducing the burden on the system administrator regarding this configuration work.

(5) Other Embodiments

Note that, although a case where the present invention is applied to storage nodes 3 which form a cluster 8 was described in the foregoing embodiment, the present invention is not limited to or by such as case and can also be applied to a storage apparatus which is used as a single entity in an environment where host apparatuses of a plurality of OS types coexist.

Moreover, although a case where the front-end unit 40, storage control unit 41, cluster management unit 42, and node management unit 43 in each storage node 3 are configured from software was described in the foregoing embodiment, the present invention is not limited to or by such a case, rather, some or all of the foregoing parts could also be configured from hardware.

Moreover, although a case where a function, which creates a volume path which couples a designated host volume HVOL to a virtual volume VVOL which is mapped to a designated global volume GVOL according to a volume path creation instruction from the management terminal 4, is built into the storage control unit 41 was described in the foregoing embodiment, the present invention is not limited to or by such a case, rather, the function unit comprising this function could also be provided separately from the storage control unit 41.

INDUSTRIAL APPLICABILITY

The present invention can be widely applied to storage apparatuses of various configurations which are used in an environment where host apparatuses of a plurality of OS types coexist.

REFERENCE SIGNS LIST

1 . . . information processing system, 2 . . . compute node, 3 . . . storage node, 8 . . . cluster, 10 . . . CPU, 11 . . . memory, 12 . . . storage device, 20 . . . cluster management program, 21 . . . node management program, 22 . . . front-end program, 23 . . . storage control program, 24 . . . scale-out database, 25 . . . OS type table, 26 . . . compute node management table, 27 . . . volume path management table, 28 . . . mode parameter table, 29 . . . HG-IVOL management table, 30 DB-side compute node management table, 31 . . . DB-side volume path management table, 40 . . . front-end unit, 41 . . . storage control unit, 42 . . . cluster management unit, 43 . . . node management unit, HG . . . host group, VOL . . . volume, GVOL . . . global volume, HVOL . . . host volume, IVOL . . . internal volume, VVOL . . . virtual volume.

The invention claimed is:

1. A storage apparatus which is used in an environment where host apparatuses of a plurality of OS (Operating System) types coexist, comprising:
   a storage control unit which processes an I/O request from the host apparatuses; and a storage device which provides a physical storage area for reading/writing data from the host apparatuses, wherein the storage control unit creates a host group by mapping the host group to each of supported OS types and configures a function which is required when processing the I/O request from the host apparatus of the supported OS type for each of the host groups,
   wherein the storage control unit creates a first volume on the storage apparatus and creates a second volume to which the physical storage area is dynamically allocated from the storage device, according to a volume creation instruction,
   wherein the storage control unit creates, according to an instruction to create a volume path from the first volume to the second volume, a volume path which passes through a third volume which is interposed between the first volume and second volume and has been allocated to the host group according to the OS type of the host apparatus provided by the first volume, and
   wherein, as a result of the storage apparatus providing the third volume to the host apparatus, when the I/O request has been supplied, the storage control unit executes I/O processing with respect to the second volume and first volume via the third volume in the volume path while using the function that has been configured for the host group to which the third volume was allocated.

2. The storage apparatus according to claim 1,
   wherein a cluster is configured from a plurality of the storage apparatuses, and
   wherein one storage apparatus among the plurality of storage apparatuses forming the cluster is selected and the second volume is created in the selected storage apparatus.

3. A control method of a storage apparatus which is used in an environment where host apparatuses of a plurality of OS (Operating System) types coexist, the storage apparatus having: a storage control unit which processes an I/O request from the host apparatus; and a storage device which provides a physical storage area for reading/writing data from the host apparatuses, the control method comprising: a first step in which the storage control unit creates a host group by mapping the host group to each of supported OS types and configures a function which is required when processing the I/O request from the host apparatus of the supported OS type for each of the host groups;

- a second step in which the storage control unit creates a second volume to which the physical storage area is dynamically allocated from the storage device, according to a volume creation instruction;
- a third step in which the storage control unit creates, according to an instruction to create a volume path from the first volume to the second volume, a volume path which passes through a third volume which is interposed between the first volume and second volume and has been allocated to the host group according to the OS type of the host apparatus provided by the first volume; and
- a fourth step in which, when the I/O request targeting the corresponding third volume has been supplied form the host apparatus, the storage control unit executes I/O processing with respect to the second volume and first volume which are coupled via the volume path to the third volume while using the function that has been configured for the host group to which the third volume was allocated.

4. The control method of a storage apparatus according to claim 3, wherein a cluster is configured from a plurality of the storage apparatuses, and wherein one storage apparatus among the plurality of storage apparatuses forming the cluster is selected and the second volume is created in the selected storage apparatus.

* * * * *